(12) United States Patent
Carlson et al.

(10) Patent No.: US 7,392,869 B2
(45) Date of Patent: Jul. 1, 2008

(54) MODULAR POWER SOURCE FOR RIDING MOWER

(75) Inventors: Martin Carlson, Tega Cay, SC (US); Kenny Wilson, Stanley, NC (US)

(73) Assignee: Textron Inc., Providence, RI (US)

( * ) Notice: Subject to any disclaimer, the term of this patent is extended or adjusted under 35 U.S.C. 154(b) by 192 days.

(21) Appl. No.: 11/265,224

(22) Filed: Nov. 1, 2005

(65) Prior Publication Data

US 2007/0095039 A1 May 3, 2007

(51) Int. Cl.
*B60K 17/28* (2006.01)
*B60K 25/00* (2006.01)

(52) U.S. Cl. ...................... 180/53.5; 180/65.1
(58) Field of Classification Search .................. 56/10.6, 56/6, 7; 180/65.1, 53.5; 280/422
See application file for complete search history.

(56) References Cited

U.S. PATENT DOCUMENTS

| | | |
|---|---|---|
| 1,401,156 A | 12/1921 | Jenkins |
| 2,417,613 A | 3/1947 | Radabaugh |
| 2,523,014 A | 9/1950 | Gooch |
| 2,702,448 A | 2/1955 | Smith |
| 3,090,184 A | 5/1963 | Hadek |
| 3,103,090 A | 9/1963 | Campbell |
| 3,106,811 A | 10/1963 | Heth et al. |
| 3,217,824 A | 11/1965 | Jepson |
| 3,230,695 A | 1/1966 | West |
| 3,339,353 A | 9/1967 | Schreyer |
| 3,404,518 A | 10/1968 | Kasper |
| 3,425,197 A | 2/1969 | Kita |
| 3,429,110 A | 2/1969 | Strasel |
| 3,472,005 A | 10/1969 | Profenna |
| 3,496,706 A | 2/1970 | Mattson |
| 3,511,033 A | 5/1970 | Strasel |
| 3,570,226 A | 3/1971 | Haverkamp et al. |
| 3,572,455 A | 3/1971 | Brueske |
| 3,581,480 A | 6/1971 | O'Conner er al. |
| 3,602,772 A | 8/1971 | Hundhausen et al. |
| 3,603,065 A | 9/1971 | Weber |
| 3,608,284 A | 9/1971 | Erdman |
| 3,608,285 A | 9/1971 | Berk |
| 3,612,573 A | 10/1971 | Hoffman |
| 3,613,337 A | 10/1971 | Akgulian et al. |
| 3,631,659 A | 1/1972 | Horowitz |
| 3,641,749 A | 2/1972 | Dwyer, Jr. et al. |
| 3,650,097 A | 3/1972 | Nokes |

(Continued)

FOREIGN PATENT DOCUMENTS

EP 589516 3/1994

(Continued)

*Primary Examiner*—Árpád F Kovács
(74) *Attorney, Agent, or Firm*—Harness, Dickey & Pierce, P.L.C.

(57) ABSTRACT

A riding mower includes a frame adapted to support a passenger and a cutting unit connected to the frame having at least one rotatably mounted blade. Interchangeable power unit support assemblies each support either an engine connected to a generator or a battery unit. One of the power unit support assemblies is releasably connected to the frame. A first electric motor is provided to rotate the blade and a second propels the mower. An output voltage generated by either the generator or the battery unit energizes the first and second electric motors.

6 Claims, 8 Drawing Sheets

U.S. PATENT DOCUMENTS

| | | | |
|---|---|---|---|
| 3,668,499 A | 6/1972 | Malloy |
| 3,668,844 A | 6/1972 | Akgulian et al. |
| 3,668,884 A | 6/1972 | Nebgen |
| 3,696,593 A | 10/1972 | Thorud et al. |
| 3,698,523 A | 10/1972 | Bellinger |
| 3,721,076 A | 3/1973 | Behrens |
| 3,729,912 A | 5/1973 | Weber |
| 3,731,469 A | 5/1973 | Akgulian et al. |
| 3,732,671 A | 5/1973 | Allen et al. |
| 3,732,673 A | 5/1973 | Winn, Jr. |
| 3,742,685 A | 7/1973 | Lian et al. |
| 3,759,019 A | 9/1973 | Wells |
| 3,796,277 A | 3/1974 | Gordon |
| 3,800,480 A | 4/1974 | Keating |
| 3,809,975 A | 5/1974 | Bartels |
| 3,832,835 A | 9/1974 | Hall et al. |
| 3,841,069 A | 10/1974 | Weck |
| 3,895,481 A | 7/1975 | Olney et al. |
| 3,910,016 A | 10/1975 | Saiia et al. |
| 3,918,240 A | 11/1975 | Haffner et al. |
| 3,924,389 A | 12/1975 | Kita |
| 3,958,398 A | 5/1976 | Fuelling, Jr. et al. |
| 3,992,858 A | 11/1976 | Hubbard et al. |
| 3,999,643 A | 12/1976 | Jones |
| 4,021,996 A | 5/1977 | Bartlett et al. |
| 4,024,448 A | 5/1977 | Christianson et al. |
| 4,048,366 A | 9/1977 | Kingsbury |
| 4,064,680 A | 12/1977 | Fleigle |
| 4,145,864 A | 3/1979 | Brewster, Jr. |
| 4,161,858 A | 7/1979 | Gerrits |
| 4,180,964 A | 1/1980 | Pansire |
| 4,265,146 A | 5/1981 | Horrell |
| 4,301,881 A | 11/1981 | Griffin |
| 4,306,402 A | 12/1981 | Whimp |
| 4,306,404 A | 12/1981 | Szymanis et al. |
| 4,307,559 A | 12/1981 | Jupp et al. |
| 4,312,421 A | 1/1982 | Pioch |
| 4,318,266 A | 3/1982 | Taube |
| 4,330,981 A | 5/1982 | Hall et al. |
| 4,333,302 A | 6/1982 | Thomas et al. |
| 4,335,569 A | 6/1982 | Keeney et al. |
| 4,351,557 A | 9/1982 | Chary |
| 4,354,569 A | 10/1982 | Eichholz |
| 4,370,846 A | 2/1983 | Arnold |
| 4,395,865 A | 8/1983 | Davis, Jr. et al. |
| 4,423,794 A | 1/1984 | Beck |
| 4,430,604 A | 2/1984 | Loganbill et al. |
| 4,479,346 A | 10/1984 | Chandler |
| 4,487,006 A | 12/1984 | Scag |
| 4,522,165 A | 6/1985 | Ogawa |
| 4,559,768 A | 12/1985 | Dunn |
| 4,562,589 A | 12/1985 | Warnaka et al. |
| 4,589,249 A | 5/1986 | Walker et al. |
| 4,642,976 A | 2/1987 | Owens |
| 4,663,920 A | 5/1987 | Skovhoj |
| 4,667,460 A | 5/1987 | Kramer |
| 4,686,445 A | 8/1987 | Phillips |
| 4,753,318 A | 6/1988 | Mizuno et al. |
| 4,756,375 A | 7/1988 | Ishikura et al. |
| 4,770,595 A | 9/1988 | Thompson et al. |
| 4,815,259 A | 3/1989 | Scott |
| 4,866,917 A | 9/1989 | Phillips et al. |
| 4,870,811 A | 10/1989 | Steele |
| 4,882,896 A | 11/1989 | Wilcox |
| 4,893,688 A | 1/1990 | Morishita |
| 4,897,013 A | 1/1990 | Thompson et al. |
| 4,920,733 A | 5/1990 | Berrios |
| 4,930,592 A | 6/1990 | Ohmura |
| 4,943,758 A | 7/1990 | Tsurumiya |
| 4,964,265 A | 10/1990 | Young |
| 4,964,266 A | 10/1990 | Kolb |
| 4,967,543 A | 11/1990 | Scag et al. |
| 4,987,729 A | 1/1991 | Paytas |
| 4,995,227 A | 2/1991 | Foster |
| 5,042,236 A | 8/1991 | Lamusga et al. |
| 5,042,239 A | 8/1991 | Card |
| 5,062,322 A | 11/1991 | Sinko |
| 5,069,022 A | 12/1991 | Vandermark |
| 5,085,043 A | 2/1992 | Hess et al. |
| 5,097,923 A | 3/1992 | Ziegler et al. |
| 5,101,922 A | 4/1992 | Ohmura |
| 5,123,234 A | 6/1992 | Harada et al. |
| 5,133,174 A | 7/1992 | Parsons, Jr. |
| 5,135,066 A | 8/1992 | Kashihara |
| 5,140,249 A | 8/1992 | Linder et al. |
| 5,150,021 A | 9/1992 | Kamono et al. |
| 5,163,273 A | 11/1992 | Wojtkowski et al. |
| 5,203,147 A | 4/1993 | Long |
| 5,204,814 A | 4/1993 | Noonan et al. |
| 5,253,729 A | 10/1993 | Suzuki |
| 5,261,213 A | 11/1993 | Humphrey |
| 5,301,494 A | 4/1994 | Peot et al. |
| 5,309,699 A | 5/1994 | Ehn, Jr. |
| 5,319,368 A | 6/1994 | Poholek |
| 5,323,593 A | 6/1994 | Cline et al. |
| 5,330,138 A | 7/1994 | Schlessmann |
| 5,343,680 A | 9/1994 | Reichen et al. |
| 5,406,778 A | 4/1995 | Lamb et al. |
| 5,415,245 A | 5/1995 | Hammond |
| 5,459,984 A | 10/1995 | Reichen et al. |
| 5,482,135 A | 1/1996 | Phillips et al. |
| 5,540,037 A | 7/1996 | Lamb et al. |
| 5,692,053 A | 11/1997 | Fuller et al. |
| 5,794,422 A | 8/1998 | Reimers et al. |
| 5,845,236 A | 12/1998 | Jolly et al. |
| 5,934,053 A | 8/1999 | Fillman et al. |
| 6,039,009 A | 3/2000 | Hirose |
| 6,044,922 A | 4/2000 | Field |
| 6,082,084 A | 7/2000 | Reimers et al. |
| 6,449,934 B1 | 9/2002 | Reimers et al. |
| 6,491,133 B2 | 12/2002 | Yamada et al. |
| 6,523,334 B1 | 2/2003 | Dettmann |
| 6,604,348 B2 | 8/2003 | Hunt |
| 6,644,004 B2 | 11/2003 | Reimers et al. |
| 6,857,253 B2 | 2/2005 | Reimers et al. |
| 2004/0168420 A1* | 9/2004 | Fillman et al. ............... 56/10.6 |
| 2005/0230168 A1 | 10/2005 | Fillman et al. |

FOREIGN PATENT DOCUMENTS

| | | |
|---|---|---|
| EP | 1508266 A2 | 2/2005 |
| JP | 5328814 | 12/1993 |
| JP | 10083189 | 3/1998 |
| JP | 2001-106042 | 4/2001 |

* cited by examiner

MODULAR POWER SOURCE FOR RIDING MOWER

TECHNICAL FIELD

The present teachings relate in general to lawn mowing machines and more specifically to a device and method for powering riding mowers.

BACKGROUND

Lawn mowing machines adapted for cutting greens of golf courses are generally powered either by gasoline powered engines or by electric motors powered by a plurality of batteries stored on the mower unit. Each design has its own power plant with unique configuration of components. Gasoline powered riding mowers have generally long operating periods on a tank of fuel. Electric powered riding mowers are generally quieter during operation than gasoline powered mowers. The power plants of known gasoline powered mowers are not interchangeable with the power plants of the electric powered mowers.

Golf courses have several conditions to meet which often do not allow the use of the above types of riding mowers. During particular times of the day, for example during early morning hours, noise concerns limit operation of gasoline powered engines and generally require that the quieter operating electric powered mowers be used. Electric powered mowers have a drawback that their operation is limited due to the length of time their batteries hold a full charge.

Golf courses therefore are often required to purchase several units of each type of riding mower, both gasoline and electric powered. This requirement results in additional costs for purchase, as well as increased costs of maintenance to maintain significantly different mower units. Because of differences in configuration, parts for one type of riding mower are generally not interchangeable with the other type, therefore increasing the quantity of different parts required to be maintained.

SUMMARY OF THE INVENTION

According to some embodiments of the modular power source for a riding mower, a power unit support assembly for a riding cutting mower includes a cutting mower frame adapted to carry a passenger. A plurality of power unit support members are each adapted for interchangeably supporting a power unit and each releasably connectable to the cutting mower frame. The power unit includes one of a reciprocating engine and a battery unit.

According to other embodiments, a riding mower includes a frame adapted to support a passenger and a reel bladed cutting unit connected to the frame having multiple rotatably mounted reel blades. A power unit support adapter is fixed to the frame. Interchangeable power unit support assemblies are each adapted to support either an engine or a battery unit. One of the power unit support assemblies is releasably connected to the power unit support adapter. An electric motor is provided to rotate the reel blades. An output voltage generated by either the engine or the battery unit mounted on the power unit support assembly energizes the electric motor.

According to still other embodiments, a method for interchangeably mounting power unit including one of an engine and a battery unit to a riding mower includes mounting the power unit to a selected power unit support assembly. The method further includes releasably connecting the selected power unit support assembly to the support device. The method still further includes releasably linking the power unit to an electric motor operable to rotate a cutting blade.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present teachings will become more fully understood from the detailed description and the accompanying drawings, wherein.

DETAILED DESCRIPTION

The following description of several embodiments is merely exemplary in nature and is in no way intended to limit the teachings, their application, or uses.

Figure 1:
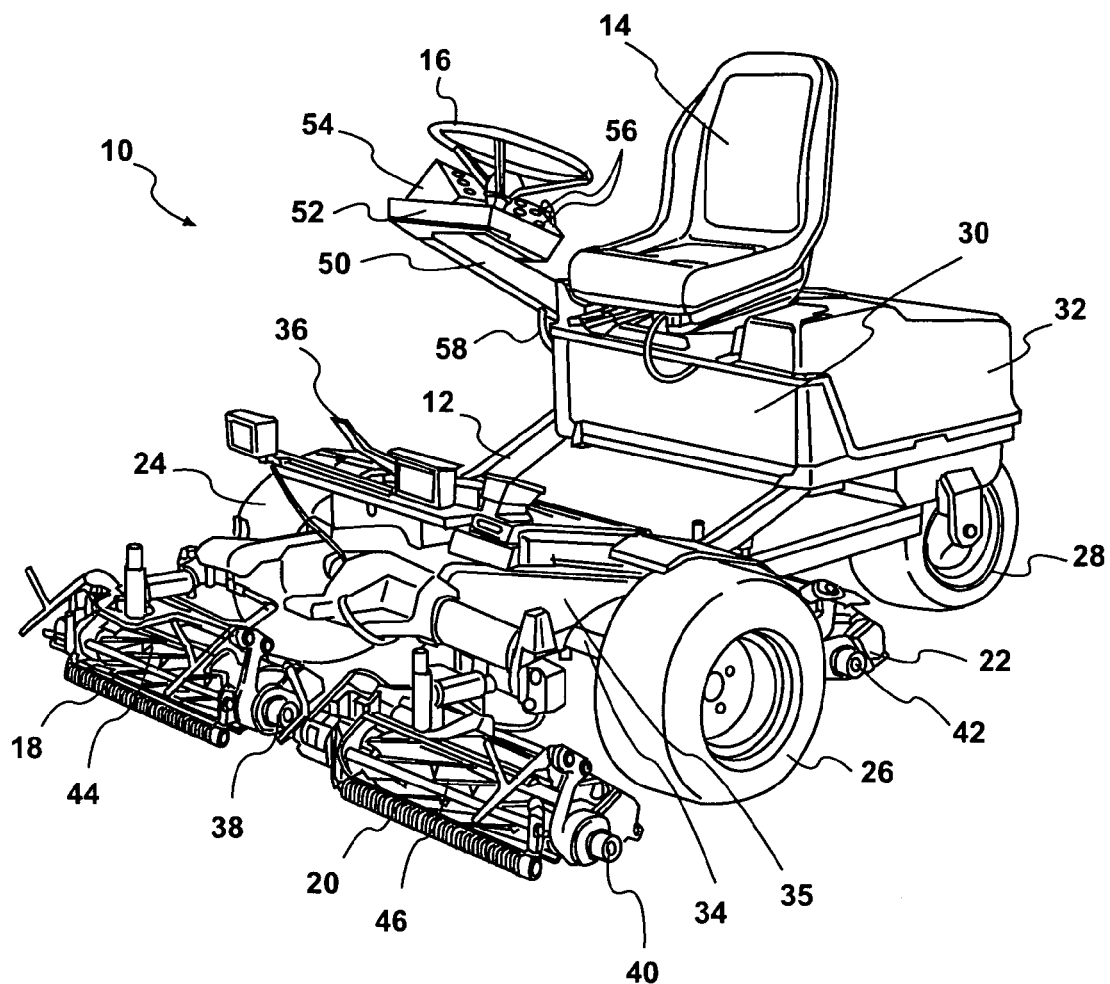
FIG. 1 is a perspective view of various embodiments of a riding mower having a modular power source.

Referring generally to FIG. 1 and according to various embodiments, in a first configuration a riding mower assembly 10 includes a frame 12 supporting a seat 14 operable to support a passenger, a steering device 16 such as a steering wheel, and a plurality of cutting units 18, 20, 22 connected to frame 12. First and second drive wheels 24, 26 and a steerable wheel 28 are connected to frame 12 and used to propel or steer riding mower assembly 10. A power unit 30 is connected to and supported by frame 12 and provided with a cover 32. Power unit 30 provides power to rotate first and second drive wheels 24, 26 via at least one axle 34 rotatably driven by a transmission 35. A speed control device 36, such as a foot controlled pedal is provided to control a forward or reverse speed of mower assembly 10.

Power unit 30 is also electrically coupled to each of a plurality of electric motors 38, 40, 42 each connected to one of the plurality of first, second and third cutting units 18, 20, 22. Electric motors 38, 40, 42 provide the rotating drive force to operate a plurality of first, second and third reel blade assemblies 44, 46, 48 rotatably mounted to individual ones of first, second and third cutting units 18, 20, 22 (third reel blade assembly 48 of third cutting unit 22 is not clearly visible in this view). A support arm 50 which is connected to frame 12 provides a support member 52 for mounting steering device 16. Support member 52 can be adjustably supported from support arm 50 to allow operator adjustment of the position of steering device 16. A control unit 54 is mounted on support arm 50 proximate to seat 14. Control unit 54 provides a plurality of switches 56 to assist the operator in selecting operating parameters of mower assembly 10 such as grass cutting height, reel blade assembly rotating speed, and operation of items such as lights. A wiring harness 58 provides electrical connection between the items supported on support arm 50 and power unit 30.

Figure 2:
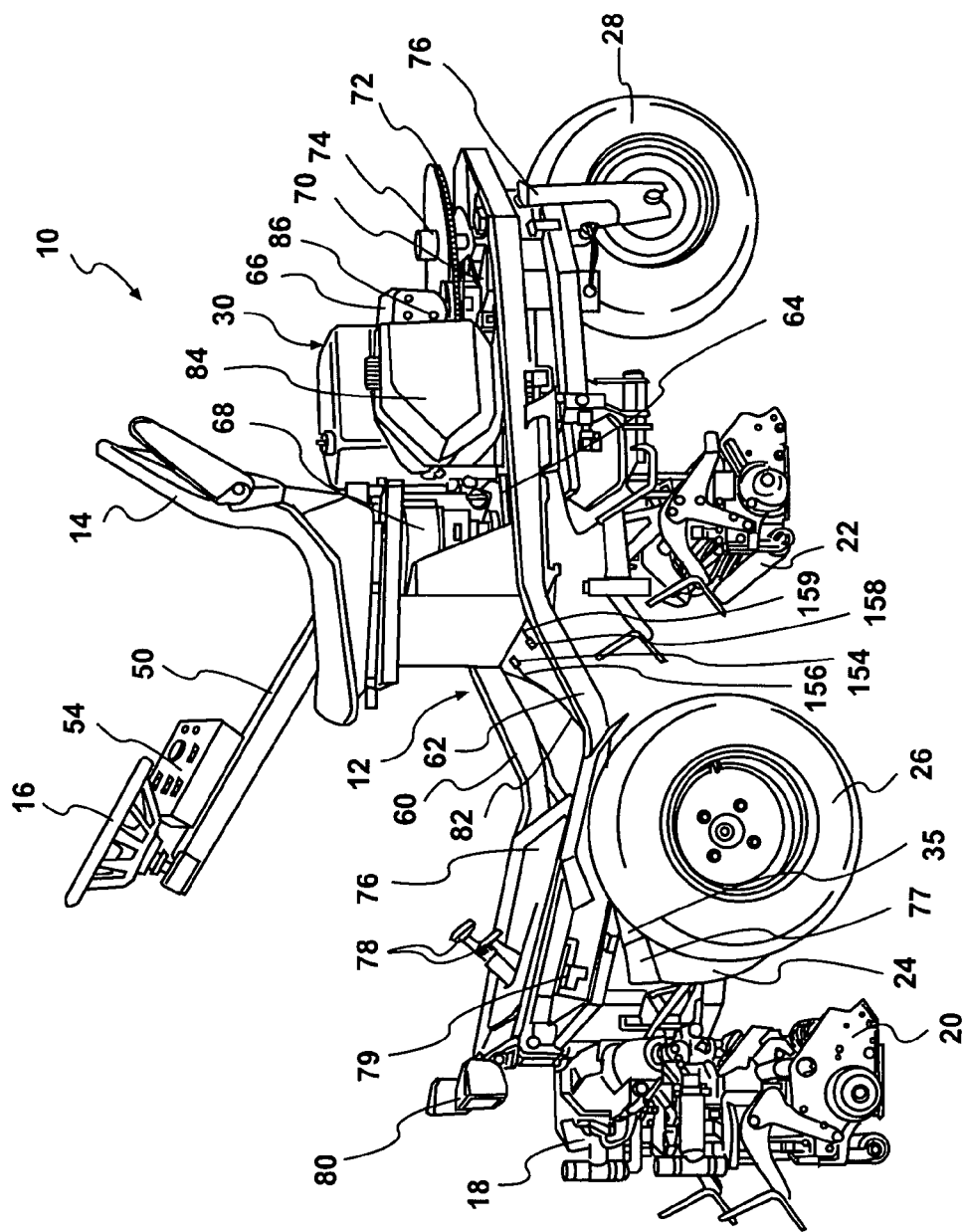
FIG. 2 is a side elevational perspective view of the riding mower of FIG. 1 with the power unit cover removed for clarity.

Referring next to FIG. 2, frame 12 further includes a frame first member 60 and a frame second member 62 respectively. A first power unit support member 64 is releasably connectable between frame first and second members 60, 62. First power unit support member 64 supports power unit 30 which in one aspect of the invention is an engine configuration 65 having a reciprocating engine 66. Reciprocating engine 66 provides the rotating power to drive one or more generators 68. First power unit support member 64 is releasably connectable to frame first and second members 60, 62 of frame 12 allowing removal and replacement of reciprocating engine configuration 65 of power unit 30.

A drive unit 70, separately supported from first power unit support member 64, receives electrical power from power unit 30. In some embodiments drive unit 70 is an electric motor which is electrically connectable to steering device 16. A chain 72 gear driven by drive unit 70 rotates a gear assembly 74 to rotate a yolk 76 for steering steerable wheel 28 when drive unit 70 receives electrical steering signals from steering device 16. Drive unit 70 and gear assembly 74 are separately supported to frame 12 from first power unit support member 64 to allow replacement of power unit 30 without removal of drive unit 70 or gear assembly 74.

Mower assembly 10 can also include a foot support structure 76, which further supports one or more pedals 78 such as brake and/or parking brake pedals. An electrical control/routing box 79 and transmission 35 are supported below and to foot support structure 76 and frame 12. Electrical control/routing box 79 is directly connected to power unit 30 and distributes electrical power to all the electrically operated equipment of mower assembly 10. Electrical power to the first, second and third electric motors 38, 40, 42, to control unit 54, to steering device 16, and to one or more headlights 80 is routed from electrical control/routing box 79 using at least one wiring harness 82. For the embodiment shown having reciprocating engine 66 and generator 68 for power unit 30, reciprocating engine 66 is supplied with fuel from a fuel tank 84 and with filtered air via an air filter 86, both also supported from first power unit support member 64.

Figure 3:
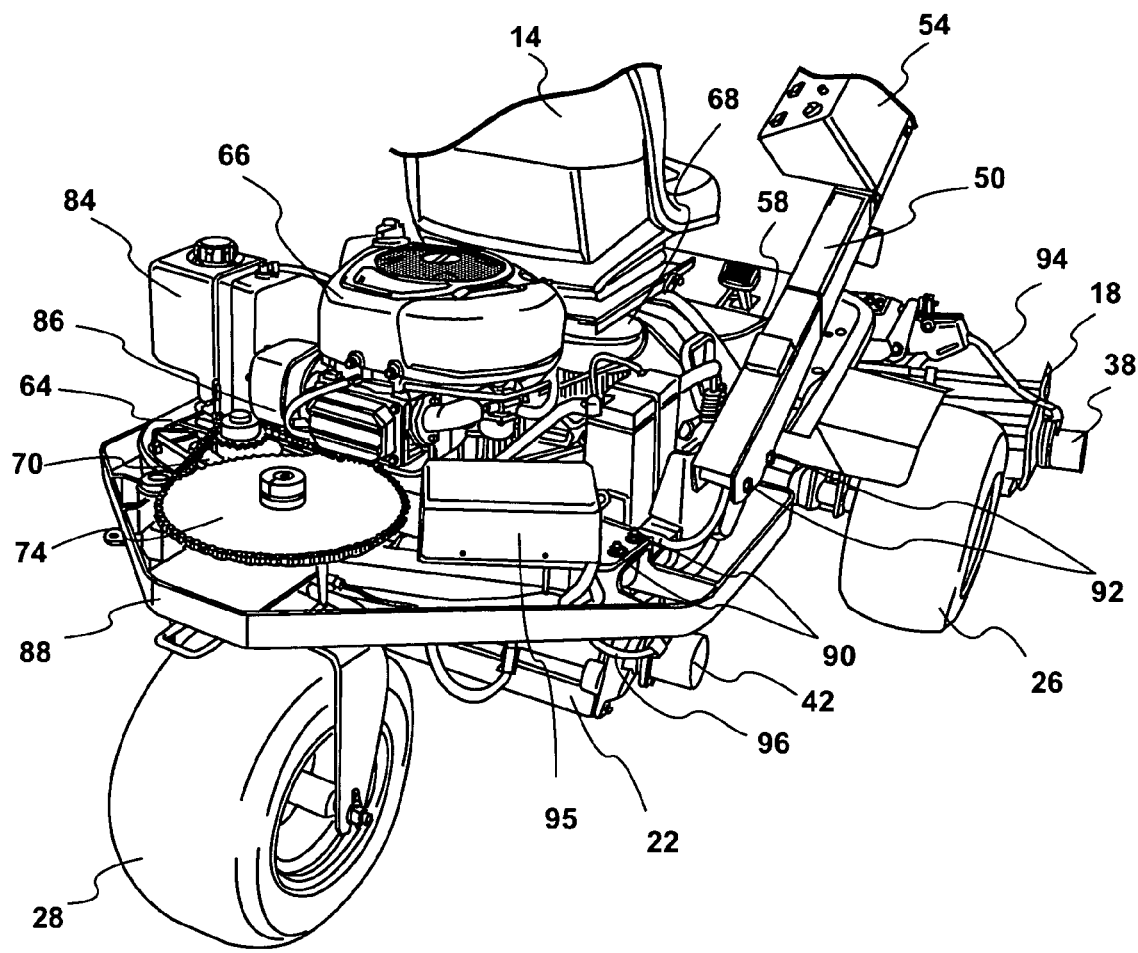
FIG. 3 is a rear perspective view of the riding mower FIG. 1 showing a motor/generator power unit installed.

Referring generally now to FIG. 3, the components supported by first power unit support member 64 are more clearly seen. First power unit support member 64 is also releasably fastened to a rear frame section 88 using a plurality of fasteners 90. As also seen in this view, support arm 50 is fixedly but can also be rotatably supported to frame 12 by one or more fastener assemblies 92. First, second and third electric motors 38, 40, 42 can be connected at either structural side of, or at alternate locations of first, second and third cutting units 18, 20, 22. In some embodiments, first electric motor 38 is connected to the right side (as viewed from an operator's viewpoint) of first cutting unit 18 and supplied with electrical power by a power cord 94. Similarly, third electric motor 42 is supplied with electric power by a power cord 96. Wiring harness 58 is exemplary of an electrical connection made between first, second and third electric motors 38, 40, 42 and control unit 54. Wiring harness 58 can also be provided as individual wires supported by or internally routed through support arm 50. Wiring harness 58 also provides electrical conductivity between power unit 30 and the various switches 56 of control unit 54. A steering controller 95 is electrically connected between steering device 16 and drive unit 70. Steering controller 95 receives electrical control signals from steering device 16 and converts these signals to displacement signals operable to rotate a drive shaft of drive unit 70 either counterclockwise or clockwise to rotate steerable wheel 28.

Figure 4:
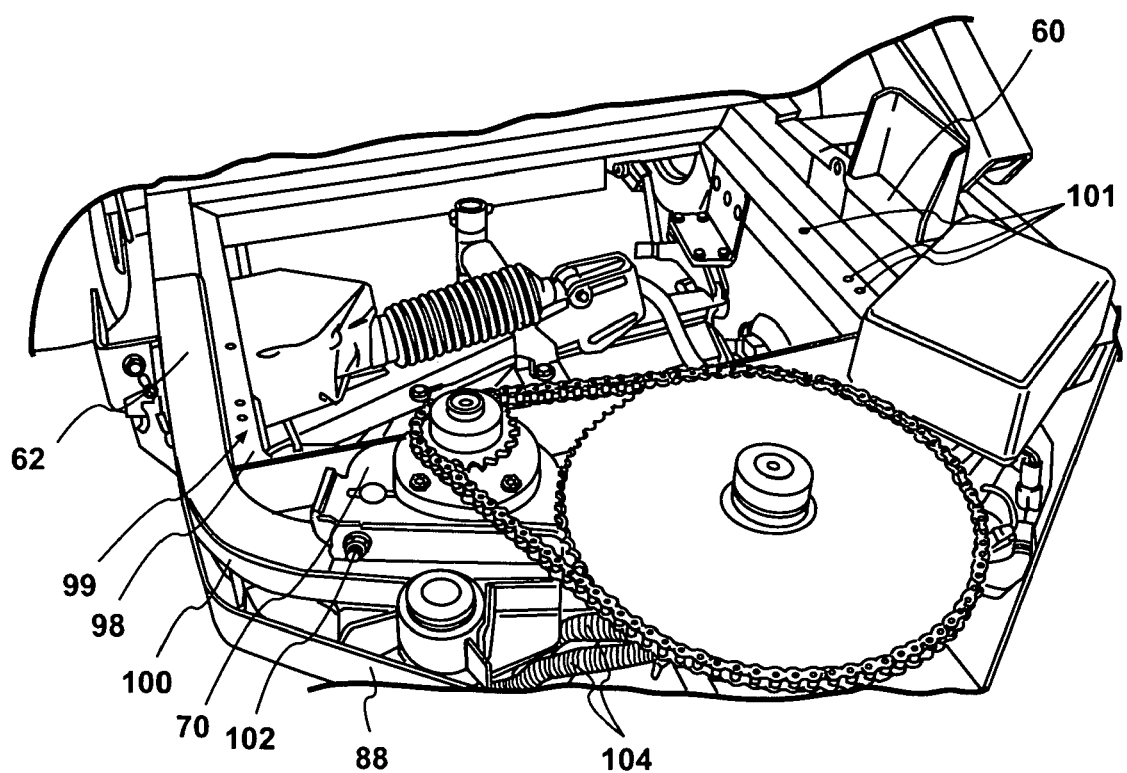
FIG. 4 is the rear perspective view of the riding mower of FIG. 3 with the motor/generator power unit removed for clarity.

As best seen in reference to FIG. 4, with power unit 30 removed for clarity, rear frame section 88 is shown connected such as by welding or fastening to distally extending ends of each of first and second frame members 60, 62. First power unit support member 64 (not shown in this view) seats partially within and is supported by a receiving member which in some embodiments is a rectangular-shaped frame section 98 defining a support surface 99. A substantially U-shaped frame member 100 joins the distal ends of first and second frame members 60, 62. Drive unit 70, gear assembly 74 and steering controller 95 are independent from power unit 30 and are therefore separately supported to frame 12. Drive unit 70, gear assembly 74 and steering controller 95 are fastenably supported to U-shaped frame member 100 using one or more fasteners 102. A plurality of wiring harnesses 104 supply electric power to items such as drive unit 70.

Figure 5:
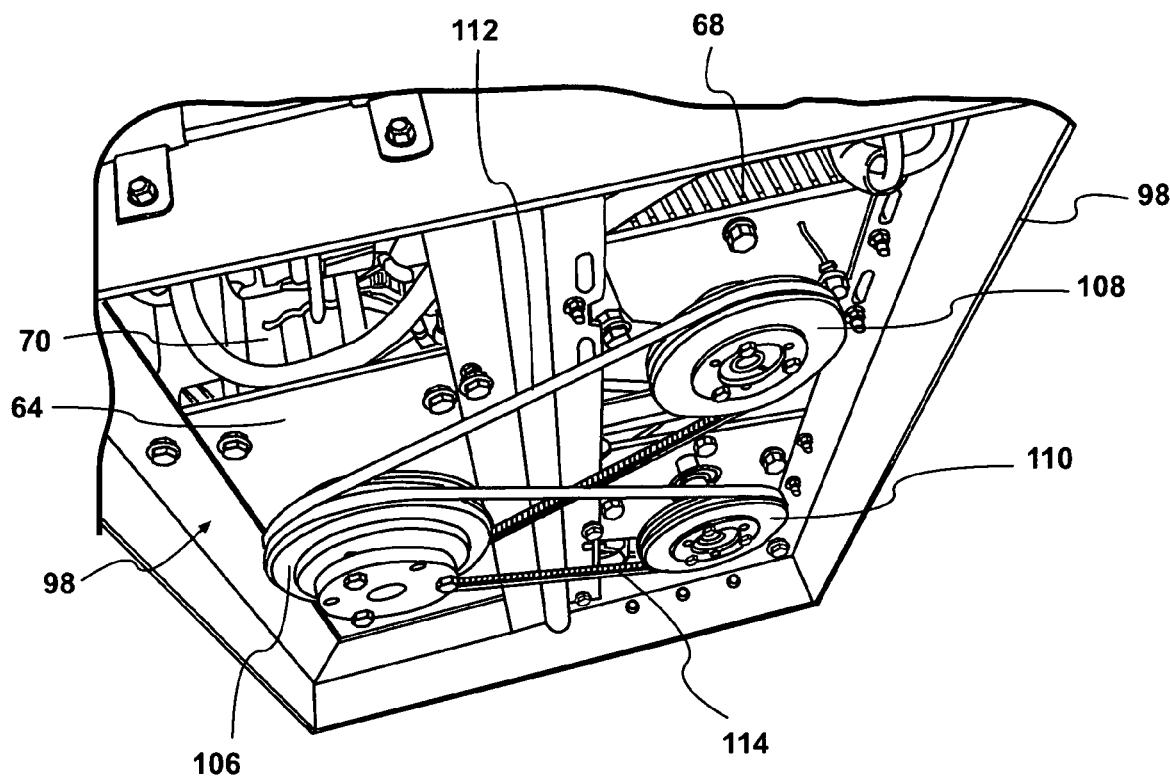
FIG. 5 is a bottom perspective view of an exemplary power unit and transmission support structural assembly according to various embodiments.

Referring next to FIG. 5, a view looking up from below rectangular-shaped frame section 98 identifies various embodiments for rotatably connecting engine configuration 65. A drive pulley wheel 106 is directly driven by reciprocating engine 66 and is rotatably coupled to each of a first and second driven pulley wheel 108, 110 by first and second drive belts 112, 114. First driven pulley wheel 108 is rotatably connectable to a first generator 116. Second driven pulley wheel 110 is rotatably connectable to a second generator 118. In other various embodiments (not shown), for a single installed generator 68, only one pulley wheel is driven by drive pulley wheel 106 to operably rotate the single generator 68.

Figure 6:
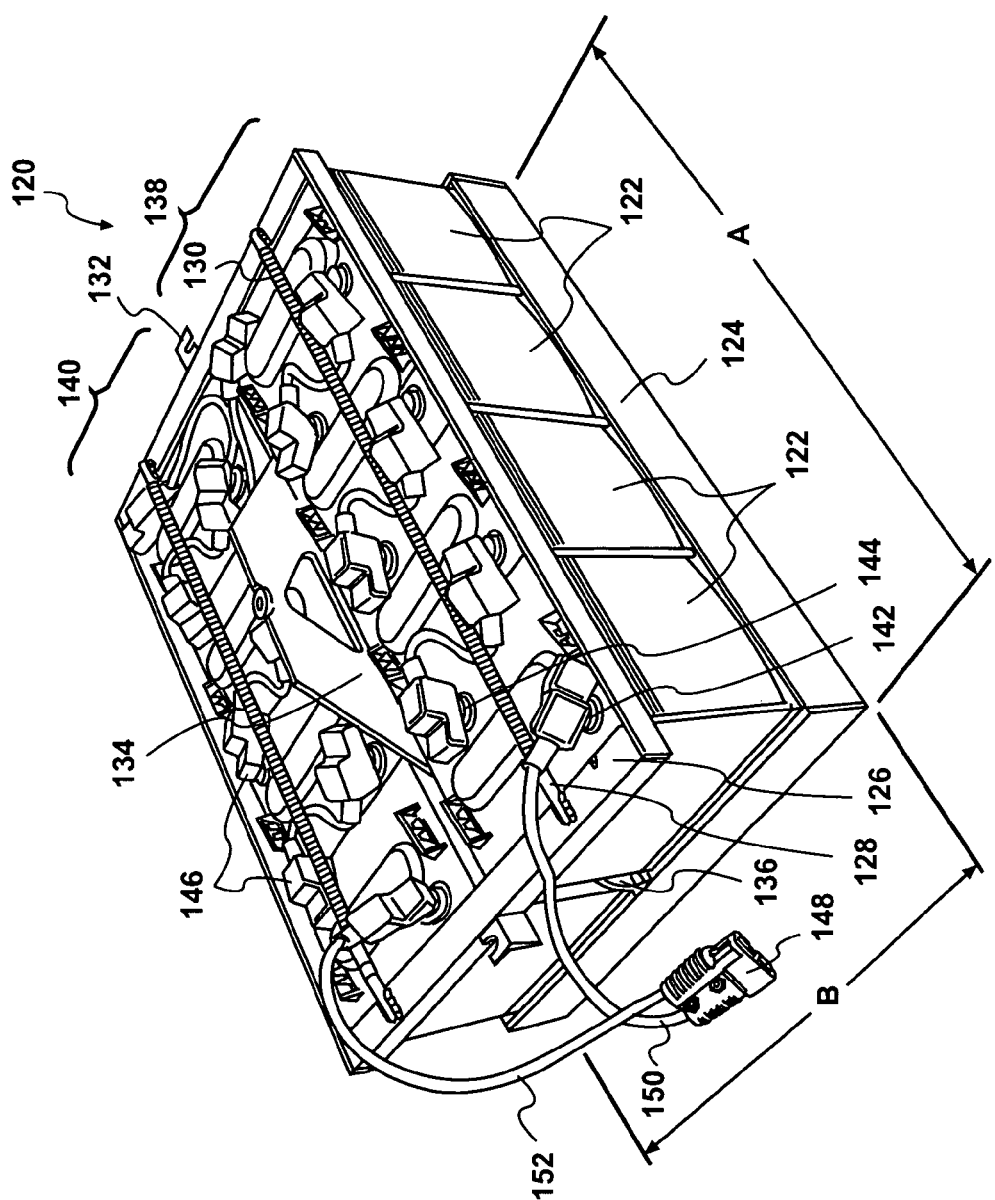
FIG. 6 is a perspective view of various embodiments of a modular power source including a plurality of batteries creating a battery unit.

Referring now to FIG. 6, according to various embodiments, power unit 30 is configured as a battery unit 120 having a plurality of batteries 122 each producing a DC voltage and current. Each of the batteries 122 are electrically coupled and jointly connected to electrical control/routing box 79 and to electric motor 77 which rotatably drives transmission 35. Batteries 122 are collectively supported by a first frame section 124 and a second frame section 126. First frame section 124 is created of substantially L-shaped members joined by fasteners or welded to each other. First and second frame sections 124, 126 are made of a metal such as aluminum or steel, but are not limited to metal material. Second frame section 126 is stiffened by one or more rods 128 spanning opposing second frame sections 126 and joined for example by welding. An insulation sleeve 130 is provided to substantially cover each rod 128 to prevent electrical short of any of the batteries 122.

A plurality of hold-down clips 132 are connected to second frame section 126 and used to fastenably restrain battery unit 120 to frame 12 of mower assembly 10. A lifting bracket 134 is joined to first frame section 124 by lifting connections 136 and used to lift battery unit 120 for installation or removal from mower assembly 10. A length dimension "A" and a width dimension "B" of battery unit 120 are controlled for slidable reception within rectangular-shaped frame section 98 of frame 12. Battery unit 120 provides a second configuration of power unit 30 which can be interchanged with the first or engine configuration 65 of power unit 30.

Battery unit 120 can be formed in multiple configurations depending on the power and voltage requirements of mower assembly 10. In various embodiments shown, (8) batteries 122 are each 6 volt DC batteries and are arranged in a first battery group 138 and a second battery group 140 each having four batteries 122. All of the batteries 122 of the first and second battery groups 138, 140 are connected in series by electrically coupling a positive terminal 142 of one battery to a negative terminal 144 of a proximate battery to produce a battery output voltage of approximately 48 volts DC from battery unit 120. A plurality of battery connector assemblies 146 are used for this purpose. A battery unit connection plug 148 flexibly extends from battery unit 120 via a positive and negative battery unit output wire 150, 152, respectively.

Referring generally to both FIGS. 2 and 6, battery unit connection plug 148 is connectably joined to a mower connection plug 154 having a power cord 156 which is routed with wiring harness 82 to electrical control/routing box 79. Electrical control/routing box 79 in turn is connected to electric motor 77, drive unit 70, control unit 54, and the remaining electrically powered items of riding mower assembly 10. Using battery unit connection plug 148 and mower connection plug 154, electrical power is provided to mower assembly 10, and battery unit 120 can be disconnected from mower assembly 10. Battery unit 120 can be adapted to provide multiple direct current voltages by varying one or both of the quantity and voltage of each battery 122 and/or by changing the line-up by varying between a series and a parallel configuration of connections between the batteries.

In a similar manner, a generator output plug 158 flexibly extending either from generator 68 or collectively from first and second generators 116, 118 by a flexible cable 159 is connected to mower connection plug 154. Reciprocating engine configuration 65 is thereby electrically connected to or disconnected from mower assembly 10. An output voltage measurable at generator output plug 158 is substantially equivalent to a battery output voltage measurable at battery unit connection plug 148.

Figure 7:
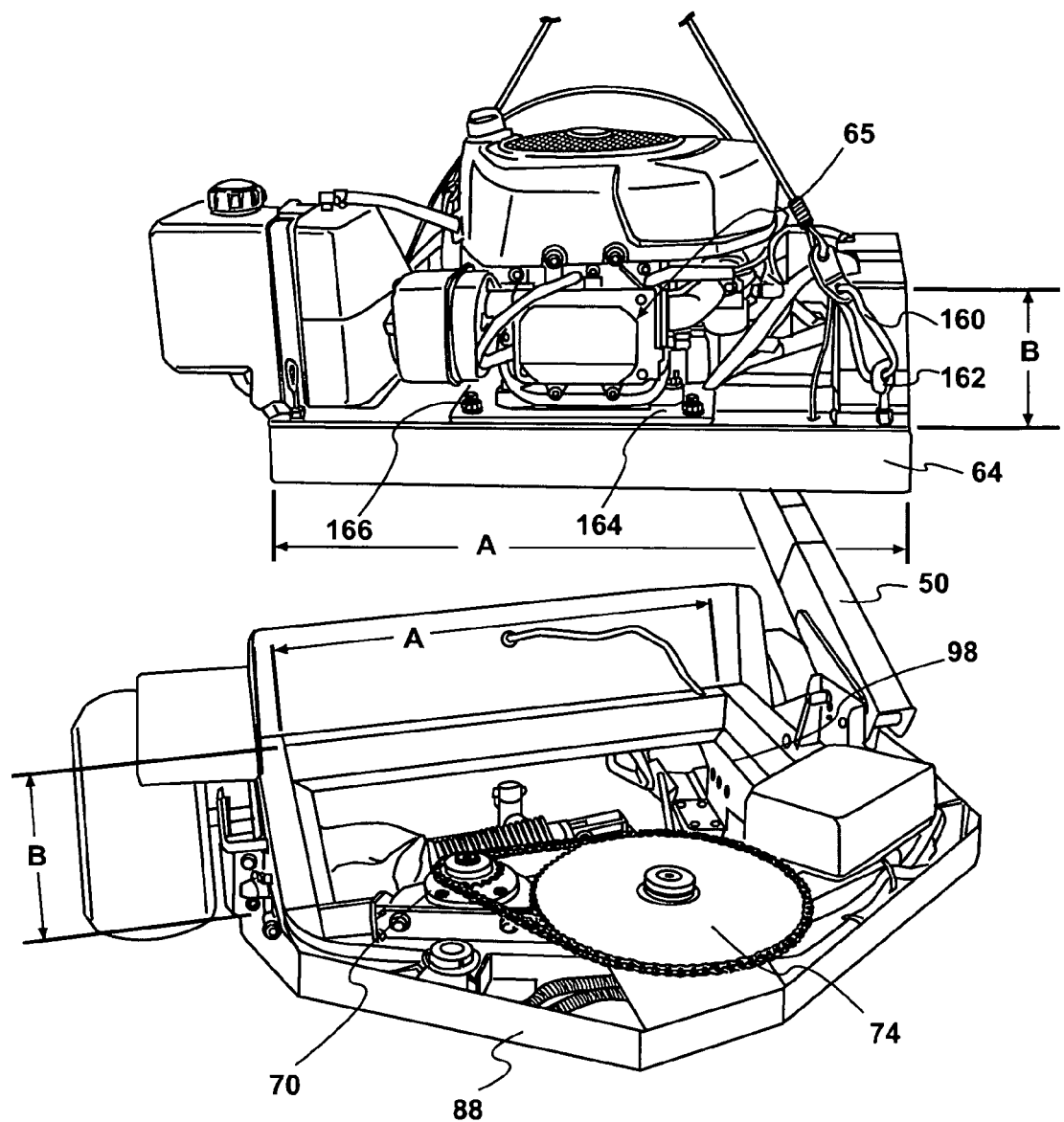
FIG. 7 is a rear perspective view similar to FIG. 4, further showing a lifting assembly capable of installing or removing the motor/generator power unit.

Referring now in general to FIG. 7, engine configuration 65 is shown temporarily supported using a lifting assembly 160. A plurality of lifting lugs 162 are either permanently or temporarily fastened to first power unit support member 64 to connect lifting assembly 160. Engine configuration 65 is fastenably mounted to a support plate 164 which is fastenably connected to first power unit support member 64. Engine configuration 65 with first power unit support member 64 (and similarly battery unit 120 with first and second frame sections 124, 126 supported by lifting bracket 134) are releasably connectable from frame 12 and transportable by lifting, for example using a lifting device such as a forklift truck or using lifting equipment such as a chain lift (not shown). Power units 30 can therefore be replaced with any other power unit 30 for different operational limitations, such as engine powered or battery powered operation for riding mower assembly 10. Power units 30 include either a battery unit connection plug 148 or a generator output plug 158 to simplify replacement of the power units 30. All power units 30 are releasably fastenable and therefore releasable from their connection to frame 12.

Figure 8:
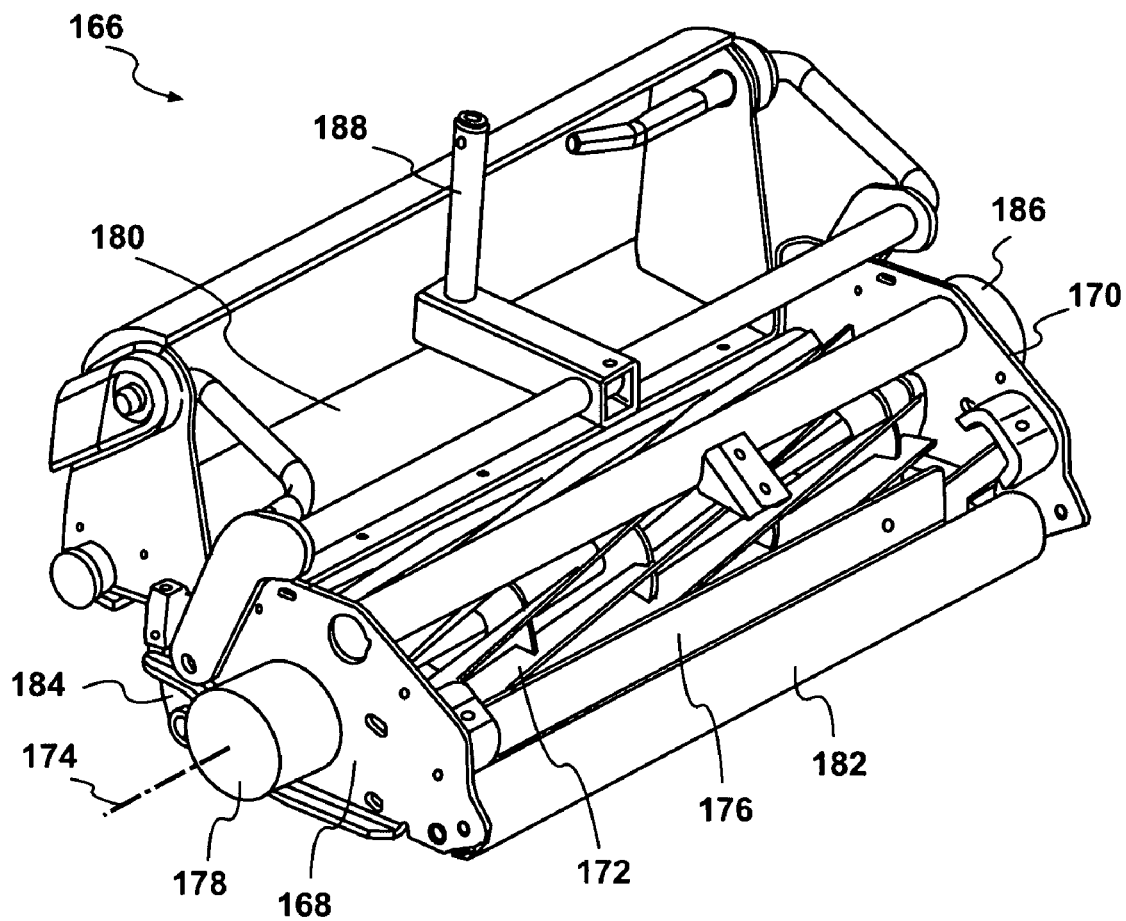
FIG. 8 is a perspective view of an exemplary reel blade cutting unit having a reel blade drive electric motor.

Referring now to FIG. 8, an exemplary reel blade cutting unit 166 of the present invention includes first and second opposed sides 168, 170 which rotatably support a reel blade assembly 172 on a blade assembly axis of rotation 174. As reel blade assembly 172 rotates it contacts a blade knife 176 to clip contacted grass. An electric motor 178 can be connected to one of first or second sides 168, 170 on axis of rotation 174 and rotates reel blade assembly 172. A rotating speed of electric motor 178 can be controlled by varying an input voltage of electric motor 178. Grass clippings are collected in a collector housing 180 connected to first and second sides 168, 170. A fixed height rotatable wheel 182 and a variable height rotatable wheel 184 support reel blade cutting unit 166 on either side of reel blade assembly 172. A position of variable height rotatable wheel 184 is selected by the operator and can be controlled using an electric motor/control mechanism 186 or similar control device to control a cutting height of reel blade assembly 172. A support assembly 188 connects reel blade cutting unit 166 to mower assembly 10 and permits raising and lowering reel blade cutting unit 166 between a cutting and a stored position.

In other embodiments, not shown, the cutting units 18, 20, 22 can be one or more rotary-type mowing or cutting units, each having one or more rotary type cutting blades. The invention is not limited by the type of cutting unit used.

A modular power source of the various embodiments for a riding mower offers several advantages. By interchangeably mounting each of a plurality of power unit types using similarly mounted support members, a riding mower can be adapted to support either a reciprocating engine or a battery unit. Either an engine having a generator or a battery unit can be used to provide electrical power to energize multiple electric motors. The electric motors are separately energized to rotate cutting unit cutting blade assemblies or to propel the mower. The interchangeable mount connections permit the power unit to be changed to accommodate different cutting conditions, such as noise restricted time periods or extended length cutting periods. A cord for each motor or a ganged electrical connection for multiple electric motors provides a releasable connection during change of the power unit.

The description of the various embodiments is merely exemplary in nature and, thus, variations that do not depart from the gist of the teachings are intended to be within the scope of the teachings. For example, alternate power sources in place of the reciprocating engine and/or battery unit identified herein can also be used, including but not limited to fuel cells, rotary engines, and alternate types of combustion engines such as propane or diesel powered engines. Such variations are not to be regarded as a departure from the spirit and scope of the teachings.

What is claimed is:

1. A riding mower, comprising:
    a frame adapted to support a passenger;
    a reel-type cutting unit connected to the frame and having a plurality of rotatably mounted reel blades;
    a power unit support fixedly connected to the frame;
    a power unit support assembly adapted for interchangeably supporting a power unit, the power unit support assembly being releasably connectable to the power unit support;
    an electric motor adapted to rotate the plurality of reel blades of the reel blade cutting unit;
    an output voltage operably generated by the power unit being operable to energize the electric motor; and
    one of an engine unit and a battery unit being selectable as the power unit, said engine unit and battery unit coupled with said power unit support assembly so that said engine unit or battery unit can be interchanged for the other to provide either engine power or battery power as desired to act as the power unit, and a mechanism for generating the output voltage, said output generating mechanism coupling with the engine unit or the battery unit to generate the output voltage.

2. The riding mower of claim 1, further comprising a cord extending from the electric motor adapted for connection to the power unit.

3. The riding mower of claim 1, further comprising a generator operably coupled to the engine unit, the generator operable to generate the output voltage, wherein the output voltage generated by the generator is substantially equivalent to the output voltage generated by the battery unit.

4. The riding mower of claim 1, further comprising a second electric motor connectable to the frame and operable to propel the riding mower.

5. The riding mower of claim 1, wherein the output voltage further comprises a 48 volt direct current voltage.

6. The riding mower of claim 1, further comprising a control unit fastenably connectable to the frame and electrically connectable to the power unit, the control unit operable to control rotation speed of at least one reel blade and propulsion speed of the mower.

* * * * *